United States Patent [19]

Lapeyre et al.

[11] Patent Number: 4,845,841
[45] Date of Patent: Jul. 11, 1989

[54] METHOD AND APPARATUS FOR CONSTRUCTING STAIRWAYS

[75] Inventors: James M. Lapeyre, New Orleans; Christopher G. Greve, Covington, both of La.

[73] Assignee: The Laitram Corporation, Harahan, La.

[21] Appl. No.: 172,068

[22] Filed: Mar. 23, 1988

[51] Int. Cl.⁴ .................. B23P 19/00; B23K 37/00
[52] U.S. Cl. .................. 29/791; 29/DIG. 48; 144/136 B; 228/44.3; 269/37; 269/45; 269/56; 269/910
[58] Field of Search .............. 29/DIG. 48, 700, 791; 228/44.3, 49.2; 269/45, 37, 910, 56, ; 144/136 R, 136 B

[56] References Cited

U.S. PATENT DOCUMENTS 4,673,011 6/1987 Lapeyre et al. ............... 144/136 B

Primary Examiner—W. Donald Bray
Attorney, Agent, or Firm—Pravel, Gambrell, Hewitt, Kimball & Krieger

[57] ABSTRACT

A stairway fabricating apparatus includes a structural machine frame that can support an elongated linear stringer work piece thereupon. A plurality of tread supports include multiple work stations which are movably supported by the frame for simultaneously supporting multiple, selectively pre-spaced stair-step treads in a position against the stringer so that the tread and stringer can be connected to define thereafter horizontal stair-step positions of staircase treads that are of a pre-selected spacing and of a pre-selected angular position with respect to the stringer. Connection of the treads to the stringers can be accomplished by welding, for example, once the correct linear spacing and the correct angular position of the treads are selected.

25 Claims, 3 Drawing Sheets

METHOD AND APPARATUS FOR CONSTRUCTING STAIRWAYS

BACKGROUND OF THE INVENTION

1. Field of the Invention:

The present invention relates to the fabricating of staircases and more particularly relates to a method and apparatus for fabricating custom staircases with selectively pre-spaced treads of preselected angular position that will define horizontal stair-step tread positions during use, wherein multiple tread work stations can be pre-spaced at regular intervals and each work station can support a tread adjacent a stringer at the desired angular orientation to that final connections by welding, for example, can be made.

2. General Background:

Staircases normally include one or more longitudinally extending members known as "stringers". The stringers support the horizontal part of the step in the staircase, known as the "tread". Stringers can be wood with the treads attached using tongue and groove connections, for example. Stringers can be metallic such as elongated beams of steel, aluminum, or the like with treads welded thereto, for example.

During the factory construction of staircases in a modular, high volume fashion, a problem arises in that each staircase to be manufactured may not be of the same dimension because of preexisting construction, and/or the custom needs of a particular home, building or structure. In such instances, the length and/or inclination of the stringers can change. Further the horizontal and vertical distances between the tread stair-step positions can vary. As a result, the angular intersection of the tread and stringer can vary from one staircase to the next. These changes in configuration can be minute from one manufactured staircase to the next, but a tread position change of even a few inches or a tread angular orientation of a few degrees eliminates the ability to repeatedly manufacture the same staircase in high volume without expensive custom carpentry, custom welding, or the like.

Various machines have been patented which related to machines that work metal, wood and work pieces with multiple material working stations. Applicant herein is the owner of U.S. Pat. No. 4,673,011, issued June 16, 1987, which related to a staircase stringer fabricating apparatus. The apparatus includes a structural machine frame having a carriage movably mounted with respect to the frame for supporting an elongated stringer work piece. A track mounted upon the structural frame defines a guide for the carriage so that the carriage can move on a controlled path with respect to the frame. Material working stations, such as wood routers, welding torches or the like, are spaced upon the machine frame for simultaneously preparing the work piece with selectively spaced-apart tread assembly portions that define a horizontal stair-step positions upon the stringer during use. The tread positions are preferably formed responsive to the movement of the carriage and work piece upon the track along the controlled path so that the work stations traverse the work piece. In the preferred embodiment, the wood routers simultaneously make cuts with equal separation in the wood stringer work piece to which individual treads can be affixed.

The present invention relates to an improvement over the apparatus disclosed in U.S. Pat. 4,673,011 in that a clamping mechanism associated with each of the plurality of work stations that support the treads in a position adjacent the stringer, in a variety of angular positions and at variable spacing so that both custom spacing and custom angular position of the treads is made at one time and simultaneously so that the entire stairway can be fabricated using welding, for example, while the treads and stringers are supported in the appropriate and desired custom position.

The Pearson U.S. Pat. No. 2,939,499 entitled "Automatic Machine For Routing Right and Left Hand Stair Stringers" provides an apparatus that uses a carriage upon which are mounted motors that are equipped with outers. The carriages are slideably moveable upon guide rails and powered by a fluid operative cylinder and piston. A mechanism is provided for adjusting the guide plates about their pivots for changing the riser-rung ratio for the stair stringers routed by the machine. The adjustment mechanism includes a block which slides a along a fixed guide extending from the back to the front of the main frame of the machine. A lead screw threads through the block and this lead screw is held against axial movement by a thrust bearing. The screw is rotated by applying a crank to the square end at the front of the machine. This apparatus requires an advancement of the stringer to each stair-step position so that the router can perform each of the multiple cuts as the stringer is advanced along its length, this is unlike the present invention wherein all the cuts are made while the work piece is held by the machine. Intervention by an operator to advance the stringer into multiple successive positions is not required. Additionally, the present invention can quickly adjust the spacing of the tread position on the stringer for each work piece, thus, custom staircases of variable dimensions and with variable tread spacing can be manufactured on a high volume basis.

Another patent showing material working machines using a plurality of work stations such as routers is the Onsrud U.S. Pat. No. 2,168,234 entitled "Grooving Machine".

Other patents, relating generally to fabricating devices are references which were cited during the prosecution of U.S. Pat. No 4,673,011 and include U.S. Pat. Nos. 769,931, issued to Baghurst; 1,352,196, issued to Hunter; 1,808,962, issued to MacKay; and 2,745,449, issued to Pearson.

SUMMARY OF THE PRESENT INVENTION

The present invention provides an improved stairway fabricating apparatus that can be used for example in the manufacturing of metallic stairways in that each tread is held in a position adjacent the stringer so that they can be welded in their permanent position with respect to both spacing and angle while being supported by the apparatus. This allows both spacing and angular position of the treads to be done on a custom basis very quickly and in fact immediately before each particular stairway is to be constructed.

The apparatus includes a structural frame and the upper surface of the frame provides an elongated support for holding an elongated stringer work piece upon the frame. Typically, the elongated stringer can be an elongated beam such as, for example, an elongated metal U-shaped stringer or the like. Tread support stations include multiple work stations that are movably supported by the frame for simultaneously supporting multiple, selectively pre-spaced treads in a position against the stringer so that the tread and stringer can be connected to thereafter defined horizontal stair-step positions of the staircase treads that are of a pre-selected spacing and of a pre-selected angular position with respect to the stringer.

In the preferred embodiment, there is further provided a track supported by the frame for guiding movement of the tread support stations with respect to each other and upon a controlled linear path with respect to the frame. In the preferred embodiment, the linear path is parallel to the elongated stringer.

In the preferred embodiment, a power source is provided for moving the tread supports into variable tread angular positions with respect to the stringer work piece.

In the preferred embodiment, adjustable spacing is provided for simultaneously varying the space between the work stations.

In the preferred embodiment, the work stations are movably mounted upon the frame upon a common linear path defined by an elongated rail.

In the preferred embodiment, the apparatus includes adjustable spacing which features a measuring device for simultaneously adjusting the distance between the work stations so that an overall selected distance spanned by all the work stations can be set while maintaining equal spacing of the work stations.

In the preferred embodiment, the measuring feature includes a plurality of endless cables, each cable supported by a sheave of different circumference, and each cable attached to a selected work station. Each sheave has a circumference which is preferably an interger multiple, starting at "2", of the smallest sheave to provide the equal spacing.

BRIEF DESCRIPTION OF THE DRAWINGS

For a further understanding of the nature, objects, and advantages of the present invention, reference should be had to the following detailed description, taken in conjunction with the accompanying drawings, in which like reference numerals denote like elements, and wherein.

DETAILED DESCRIPTION OF THE PREFERRED EMBODIMENT

Figure 1:
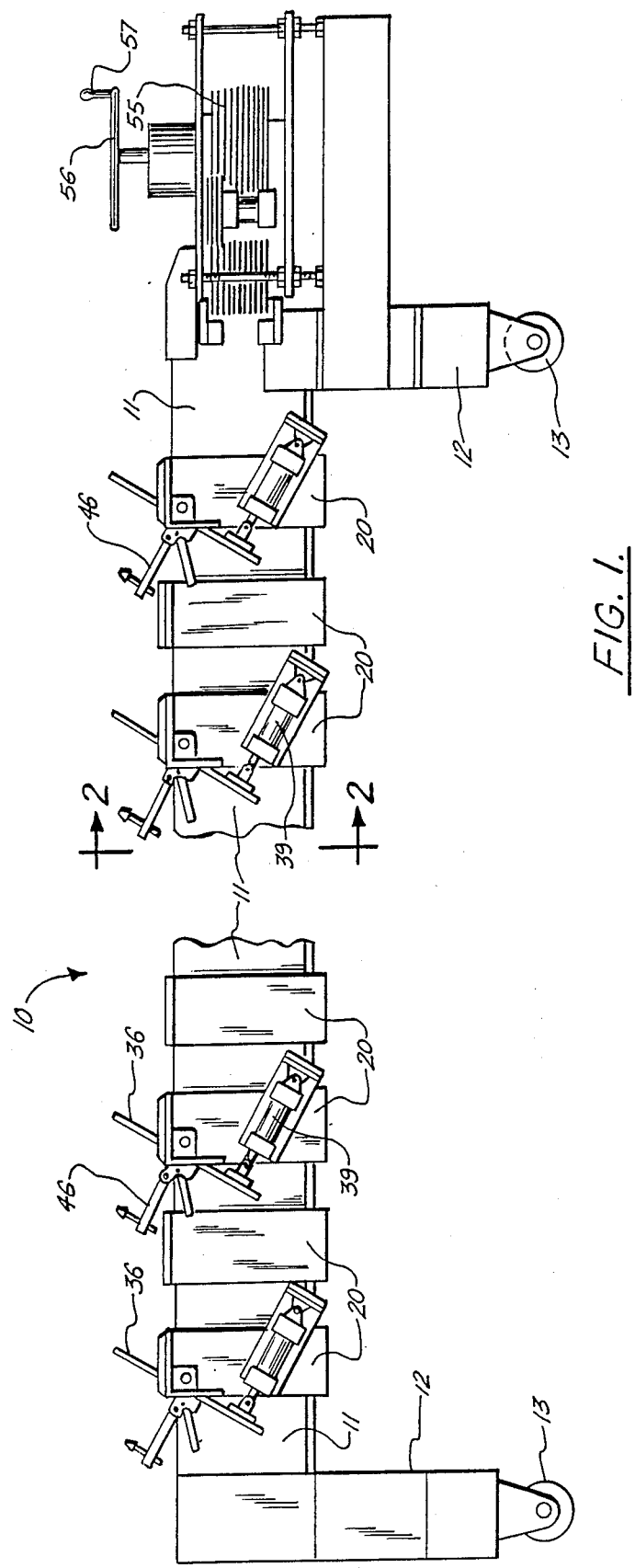
FIG. 1 is a fragmentary, elevational view of the preferred embodiment of the apparatus of the present invention.
Figure 2:
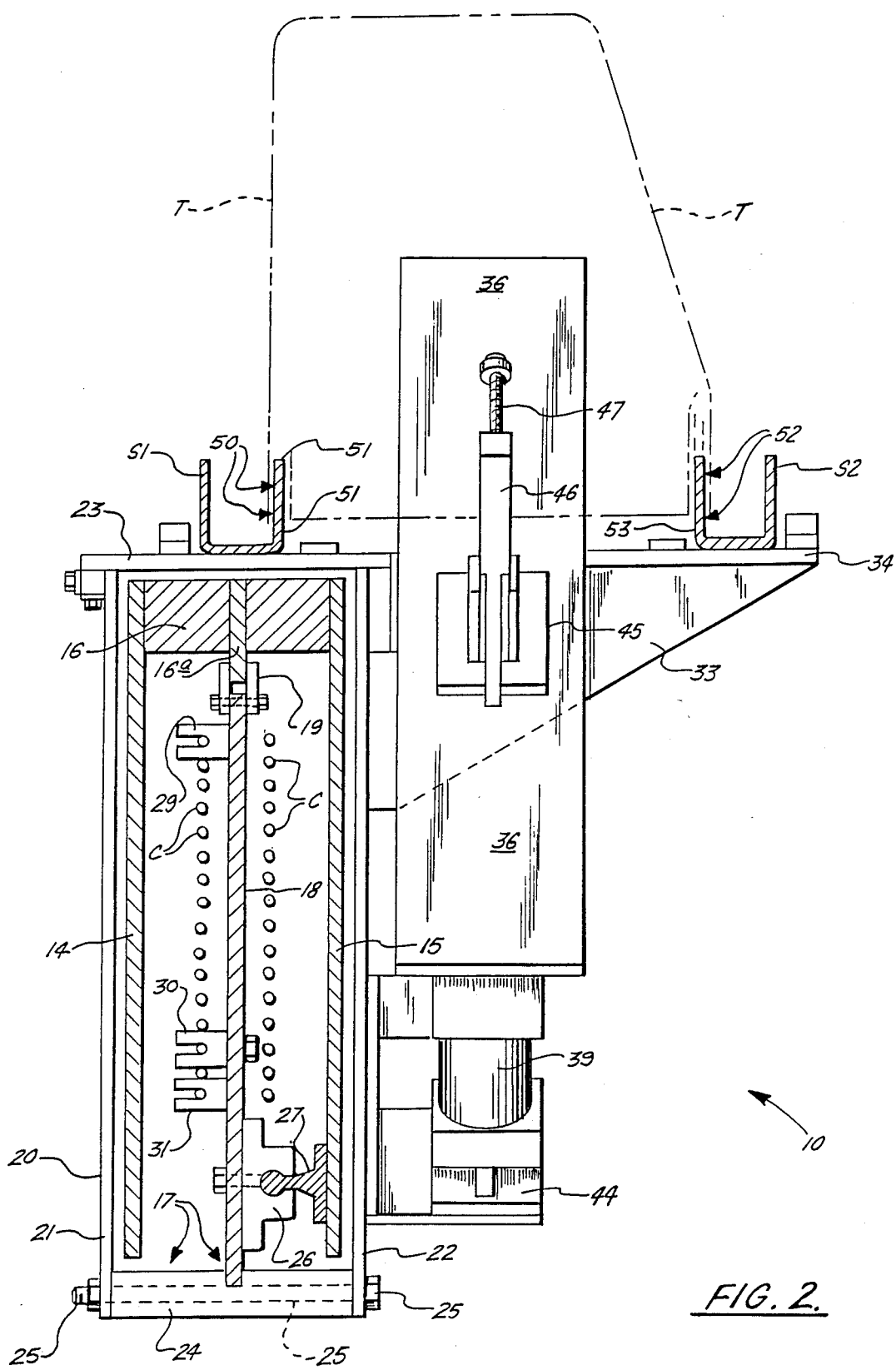
FIG. 2 is a sectional view taken along lines 2—2 of FIG. 1.
Figure 3:
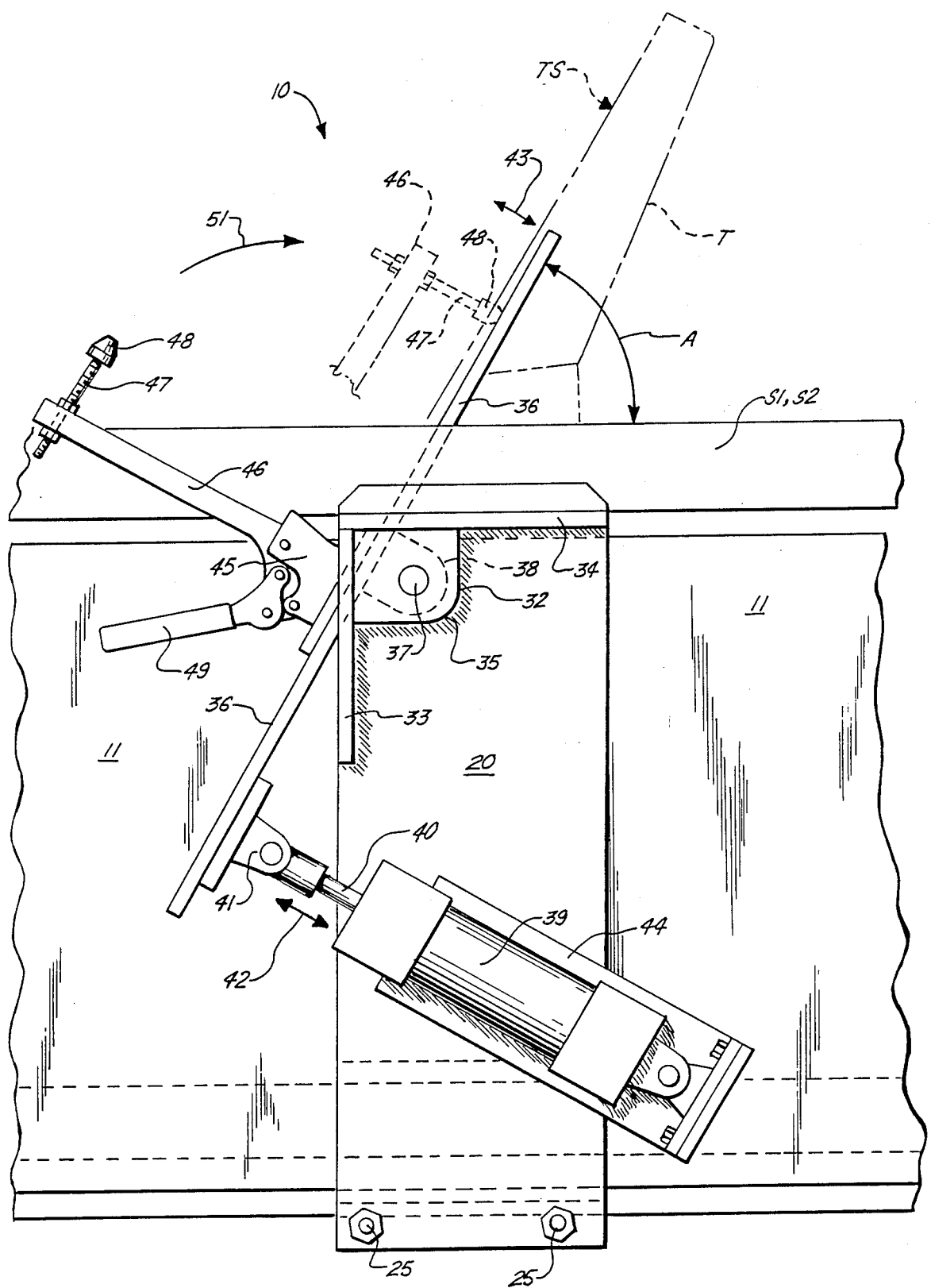
FIG. 3 is a detailed fragmentary elevational view of the preferred embodiment of the apparatus of the present invention illustrating a single tread support station.

FIGS. 1-3 illustrate the preferred embodiment of the apparatus of the present invention designated generally by the numeral 10. In FIGS. 1-3, there can be seen an elongated beam 11 defining a machine frame having a plurality of legs 12, each equipped with rollers or casters 13 so that the frame can be moved. The beam 11 includes beam side portions 14, 15 and a beam top portion 16. The beam 11 includes an open bottom 17 so that individual work stations 20 can be assembled upon the beam and bolted into place.

Multiple tread support stations 20 each provide a generally rectangular frame mounted upon the beam 11. The rectangular frames of the work stations 20 include side portions 21, 22, a top portion 23, a central beam 18, and a bottom portion which is in the form of bushings 24 and bolted connections 25.

The connection between beam 11 and work stations 20 is a movable yet structural connections, best seen in FIG. 2, in the form of a conventional bearing assembly including portions 26, 27 which slide with respect to one another. The portion 27 is a rounded section portion and the portion 26 provides an elongated rail socket. The portion 27 registers within the socket portion 27 and slides with respect thereto. The portions 26, 27 are commercially available linear-type bearing assemblies. Thus, using the bearing assemblies 26, 27 each work station 20 slides linearly along beam 11 along a preferably common linear path. At the top of central beam 18 is a guide 19 which aligns the beam 18 with center plate 16 of a beam 11 top 16.

A plurality of endless wire cables C (see FIG. 2) extend the full length of beam 11 and are connected selectively to sliding work stations 20 at center beam 18 by means of cable connectors 29-31. Connectors 29-31 simply clamp each work station to a particular endless cable C. Thus, when an endless cable is moved, it pulls the work station in the direction of sheave rotation. One cable connector 29-31 is provided for each work station, and two work stations are connected to each endless cable associated with a particular sheave. For example, cable connectors 29 and 31 are connected to the same endless cable, i.e., the outermost endless cable, which is mounted upon the largest diameter sheaves and would move the outermost, farthest apart work stations.

The movement of individual work stations using the endless cables C and multiple variable diameter sheaves are disclosed more particularly in U.S. Pat. No. 4,673,011, issued June 16, 1987, and entitled "Staircase Stringer Fabricating Apparatus," that patent being incorporated herein by reference. U.S. Pat. No. 4,673,011 is assigned to The Laitram Corporation of Harahan, L.A., assignee of the present application.

Adjustable spacing of the individual work stations 20 is accomplished by using a plurality of endless cable C, each cable C being supported by a sheave of difference circumference and with each cable attached to two selected work stations 20, each sheave having a circumference which is an interger multiple, starting at "2", of the smallest sheave to provide the equal spacing.

A tread support assembly 32 supports individual stair-step treads T (see FIGS. 2 and 3) in desired positions with respect to stringers S1, S2. The stringers, shown best in FIG. 2, are simply elongated beams of uniform cross-section, with U-shaped cross-sectional stringer beams being shown in FIG. 2, and in the FIG. 2 illustration, two beams S1, S2 are illustrated as stringers to which treads T will be attached. The work stations 20 are spaced along the beam 11, as best shown in FIG. 1. However, the tread support assemblies 32 are alternated in their position on either side of beam 11, as best seen in FIG. 1. This allows stair-steps to be alternated from left to right sides of stringer S1. A third stringer, not shown in FIG. 2, would be used with those work stations 20 on the opposite side of the work station shown in FIG. 2. Thus, alternating left and right stair-step treads would be assembled by alternate work stations 20 in forming the stairway. The stringer S1 in FIG. 2 represents the center stringer of the stairway, the stringer S2 represents the left-hand stringer while the right-hand stringer is not shown in the drawings. However, it should be understood that the right-hand treads would be assembled using a station which is a mirror image of the view of FIG. 2.

Each tread support assembly 32 includes a vertical gusset plate 33, a horizontal plate 34, and a pivot plate 35. A tread position plate 36 is pivotally attached at pivot 37 to tread support assembly 32. An eyelet plate 38 having an opening therein forms a pivotal connection at the opening and pivot 37 between tread position plate 36 and tread support assembly 32 so that the plate 36 can pivot with respect to work station 20, and more particularly with respect to the rectangular frame thereof defined by sides 21, 22, top 23 and bottom bushings 24. The tread position plate 36 is movable between two angular plate positions of 56 degrees and 68 degrees as defined by angle A. However, it should be understood that detents or other locking means could be used to stop plate 36 in any desired angle position "A".

A hydraulic cylinder 39 is mounted upon hydraulic cylinder support 44 to one side, either 21 or 22 of work station 20. The hydraulic cylinder 39 includes an extensible push rod 40 which can reciprocate in and out, as shown by the Arrow 42 in FIG. 3. This reciprocating movement of push rod 40 produces a corresponding pivotal movement of the plate 36, as shown by the curved Arrow 43 in FIG. 3. Gusset 41 forms a connection between plate 36 and push rod 40. Such pivotal movement of plate 36 also effects a change in angular position of the stair-step tread T with respect to the stringers S1, S2, and thus defines different angular positions of the stair-step treads T with respect to the stringers S1, S2 so that variable stair-step tread angular positions with respect to the stringers S1, S2 can be achieved as desired in making custom staircases.

A clamp assembly 45 is provided at work station 20 having an arm 46, a threaded shaft 47 equipped with an end cap 48, preferably of rubber or like pliable material. A handle 49 can be moved upwardly which moves the arm 46 through a pivotal path, as shown by the Arrow 51 in FIG. 3, which eventually causes the end cap 48 to bear against the tread T wear surface TS holding it in a fixed position upon plate 36, as shown in FIG. 3. The end cap 48 position with respect to the tread T can be adjusted to ensure a snug fit by simply rotating the threaded shaft 47 to adjust its position with respect to arm 46. A desired clearance between end cap 48 and plate 36 can be obtained when arm 46 is in the clamping position, shown in phantom lines in FIG. 3, so that the tread T will be securely held against plate 36.

An inspection of FIG. 2 reveals that when clamped, the tread T is held in a position adjacent the stringers S1, S2 so that the tread T can be connected to the stringers S1, S2 by welding, for example. Thus, using the apparatus of the present invention, both linear spacing along the stringers S1, S2 and angular position of the treads with respect to the stringers S1, S2 can be effected in a simple, straightforward manner and at the time each individual stairway is to be fabricated. The present invention thus provides a method for very quickly manufacturing custom stairways with any desired spacing between treads and of variable tread angular positions with respect to the stringers. For purposes of illustration, in FIG. 3 the angle "A" illustrates the angular position between the tread T and the stringers S1, S2. In FIG. 3, the surface TS designates the tread wear surface, which is the operative wear surface contacted by the foot of a user when the stairway is in operation.

In FIG. 2, a weld line 50 can form a connection between the flange 51 of stringer S1 and the tread T. Likewise, 52 indicates a weld line for forming a welded connection between the tread T and stringer S2 at flange 53 of stringer S2. Such a welded connection can be made manually, or using a welding robot after the desired spacing between work stations 2 has been set and after the tread position plate 36 has been moved into the appropriate angular position "A" with respect to stringers S1, S2.

In FIG. 1, sheave assembly 55 includes a plurality of sheaves of different circumferences which includes preferably a multiple interger starting at "2" of the smallest sheave. A hand wheel 56 provides a handle 57 so that rotation of the hand wheel using the handle 57 moves the work stations 20 into pre-spaced linear positions upon beam 11. As aforedescribed, the details of construction and operation of the spacing of work stations 20 using multiple sheaves and endless cables is described in U.S. Pat. No. 4,673,011, entitled "Staircase Stringer Fabricating Apparatus."

In view of the numerous modifications which could be made to the preferred embodiments disclosed herein without departing from the scope or spirit of the present invention, the details herein are to be interpreted as illustrative and not in a limiting sense.

What is claimed as invention is:

1. A stairway fabricating apparatus comprising:
   (a) a structural machine frame;
   (b) means for supporting an elongated stringer work piece upon the frame; and
   (c) tread support means including at least one movable work station, movably supported by the frame for supporting a stair-step tread in a first position against the stringer so that the tread and stringer can be connected to define a horizontal stair-step position of the staircase tread that is at a pre-selected spacing position along the stringer of a pre-selected spacing and of a pre-selected angular position with respect to the stringer; and
   (d) means for moving the tread support means into a second position upon the frame that is spaced from the first position, and in which a tread supported by the tread support means is correspondingly supported adjacent the stringer.

2. The apparatus of Claim 1 further comprising track means supported by the frame for guiding movement of the tread support means upon a controlled path with respect to the frame.

3. The apparatus of Claim 1, wherein there are multiple tread support means defining two or more work stations each movably supported upon the frame.

4. The apparatus of claim 1 further comprising power means for moving the tread support means into variable tread angular positions with respect to the stringer work piece.

5. The apparatus of claim 3 further comprising adjustable spacing means for simultaneously varying the space between the work stations.

6. The staircase stringer fabricating apparatus of claim 5, wherein the work stations are movably mounted upon the frame upon a common, linear path.

7. The staircase stringer fabricating apparatus of claim 6, further comprising bearing means on the frame for slideably supporting the work stations on the common linear path.

8. The staircase stringer fabricating apparatus of claim 5, wherein the adjustable spacing means includes measuring means for simultaneously adjusting the distance between the work stations so that an overall selected distance spanned by all the work stations can be set while maintaining equal spacing of the work stations.

9. The staircase stringer fabricating apparatus of claim 8, wherein the measuring means comprises a plurality of endless cables, each cable supported respectively by a sheave of different circumference and each cable attached respectively to a selected work station, each sheave having a circumference which is an interger multiple, starting at "2", of the smallest sheave to provide said equal spacing.

10. A stairway fabricating apparatus for assembly of stair-step treads on an elongated stairway stringer work piece comprising:
(a) an elongated frame;
(b) a stairway stringer work piece support for holding the work piece in an assembly position adjacent the frame;
(c) a plurality of tread assembly support means, each mounted for travel on the frame for supporting multiple treads in pre-spaced stair-step assembly positions adjacent the stringer in its assembly position, and at a predetermined adjustable stair-up tread angle, so that a connection can be formed between the treads and the stringer work piece in the assembly position; and
(d) adjustable spacing means for selectively varying the overall distance between treads, such as for various rise dimensions and for a variable number of stair-step positions, so that the individual tread support means and correspondingly the individual treads can be adjustably spaced to desired preselected tread assembly positions.

11. The staircase stringer fabricating apparatus of claim 10, wherein the adjustable spacing means includes a plurality of endless cables each supported by spaced apart sheaves, including a master sheave with multiple diameter roller surfaces that respectively carry the plurality of cables so that rotation of the cables move different distances responsive to rotation of the master sheave.

12. A staircase fabricating apparatus for assembling stair-step treads on an elongated work piece having a linear longitudinal axis, comprising:
(a) an elongated support frame;
(b) multiple tread support means movably supported for travel upon the frame and spaced longitudinally therealong for holding treads in pre-spaced stair-step positions and at predetermined angles with respect to an elongated stringer work piece positioned adjacent the frame;
(c) guide rail means supported by the frame for defining a linear path of movement for the tread support means along a line that is parallel to the stringer during use; and
(d) means for moving the tread support means with respect to the frame;
(e) clamp means carried by the tread support means for holding a stair-step tread in a position of desired angle and spacing with respect to and adjacent the stringer work piece so that the tread can be connected to the stringer in the same position as it is supported by the clamp means.

13. The apparatus of Claim 12, wherein the guide rail means comprises at least one elongated bearing path slideably interfacing all the tread support means upon a common linear path.

14. The apparatus of Claim 12, wherein the tread support means includes a clamp on each tread support means for holding an individual stair-step treads.

15. The apparatus of Claim 12, wherein the tread support means comprises in part, means for pivotally moving the treads into a multiple of angular positions with respect to the stringer.

16. The apparatus of Claim 15, wherein the pivotally moving means is powered.

17. The apparatus of Claim 16, wherein the moving means includes a fluid activated cylinder.

18. The apparatus of Claim 12, wherein the clamp means comprises a tread support plate pivotally mounted with respect to the frame, and a clamping mechanism carried by the tread plate.

19. The apparatus of claim 12 wherein the support means can support multiple, general parallel stringers for assembly of treads thereto.

20. The apparatus of claim 19 wherein the frame and support means can support three stringers including a central stringer and two side stringers, and wherein each tread can be attached to a central stringer and to one side stringer.

21. The apparatus of claim 2, wherein the controlled path is generally parallel to the stringer during the assembly of a stairway.

22. The apparatus of claim 12, wherein the frame includes an elongated beam.

23. The apparatus of claim 22, wherein the support means includes a plurality of work stations mounted for travel upon the beam.

24. The apparatus of claim 10, wherein the work piece support includes at least a portion of the frame.

25. The apparatus of claim 10, wherein the work piece support includes at least in part, a plurality of the tread assembly support means.

* * * * *